United States Patent [19]

Fassel et al.

[11] Patent Number: 4,514,670

[45] Date of Patent: Apr. 30, 1985

[54] ELECTRIC POSITIONING MOTOR CONTROL SYSTEM, PARTICULARLY AUTOMATIC VEHICLE ANTENNA EXTENSION SYSTEM

[75] Inventors: Reinhard Fassel, Oberasbach; Werner Meier, Rednitzhembach; Hans Rauch, Fürth; Jürgen Wesemeyer, Nuremberg; Hans-Joachim Raddant, Berlin, all of Fed. Rep. of Germany

[73] Assignee: Robert Bosch GmbH, Stuttgart, Fed. Rep. of Germany

[21] Appl. No.: 511,152

[22] Filed: Jul. 6, 1983

[30] Foreign Application Priority Data

Jul. 16, 1982 [DE] Fed. Rep. of Germany ....... 3226614

[51] Int. Cl.³ .............................................. H02P 1/22
[52] U.S. Cl. .................................... 318/467; 318/266; 318/284; 318/286
[58] Field of Search ............... 318/467, 466, 468, 469, 318/470, 284, 280, 281, 283, 285, 286, 266

[56] References Cited

U.S. PATENT DOCUMENTS

| | | | |
|---|---|---|---|
| 3,199,006 | 8/1965 | Moyeines et al. | 318/467 X |
| 3,689,814 | 9/1972 | Holt | 318/286 X |
| 3,815,005 | 6/1974 | Berger | 318/286 X |
| 3,881,140 | 4/1975 | Hartman | 318/467 X |
| 4,263,536 | 4/1981 | Lee et al. | 318/468 X |
| 4,329,631 | 5/1982 | Betsch et al. | 318/466 |
| 4,338,552 | 7/1982 | Pilz et al. | 318/284 X |
| 4,364,003 | 12/1982 | Phipps | 318/467 |
| 4,373,149 | 2/1983 | Coste | 318/281 |

Primary Examiner—S. J. Witkowski
Assistant Examiner—Bentsu Ro
Attorney, Agent, or Firm—Frishauf, Holtz, Goodman & Woodward

[57] ABSTRACT

A commutator-type d-c motor has its line current connected through a sensing resistor (18) or transformer (18'), the pulses of which, upon energization, are counted in a counter (C) and also passed to a speed sensing circuit (S) in a control circuit (30), energization of the motor being disconnected if the frequency of undulations or waviness of the motor current drops, thus indicating that the positioned element, for example an antenna, window, or sliding roof of an automobile has reached a limiting position. The counter can be used to establish intermediate positions, upon suitable control by a selector switch (27) or a reference count number stage (C-Ref) controlled, for example, by a potentiometer (P) or from the selector switch (27). A timing circuit (T) prevents short-circuit through the motor upon manual sudden reversal of command of direction of rotation. The main switch can be coupled to a car radio to extend the car radio antenna upon energization thereof, retract the antenna upon de-energization, the selector switch also permitting manual retraction or projection, and disabling of the system if, for example, the radio is used for stored, e.g. tape reproduction.

26 Claims, 3 Drawing Figures

ELECTRIC POSITIONING MOTOR CONTROL SYSTEM, PARTICULARLY AUTOMATIC VEHICLE ANTENNA EXTENSION SYSTEM

The present invention relates to a positioning system for an electric motor, and more particularly to control the energization and de-energization of a commutator-type d-c motor which is reversely operable and manually controllable to ON position and stopping at predetermined limit positions while gently approaching the limit positions.

BACKGROUND

Various types of positioning apparatus are used in which commutator-type motors, typically permanent magnet d-c motors, are used for moving a positioned element in one or two limit positions, and in which the positioning motor is manually controlled to ON, or moving position, while stopping automatically when the limit position is being reached, without, however, being turned OFF by a limit switch. Circuit arrangements of this type are used, for example, for projection and retraction of telescopic antennae on vehicles, or in other automotive applications, for example for automatic window closures, operation of sliding windows, or the like; or for any other use in which a positioned, movable element can move between two predetermined end or limit positions.

One circuit arrangement for a motor-driven antenna uses a relay to connect the antenna extension motor, and at the same time energizes electronic timing circuits. The ON switch of the motor can be coupled to an automotive radio which, upon turning the radio ON, simultaneously causes the antenna to be projected; upon turning the radio OFF, the antenna is retracted. It is difficult to control projection or retraction of a motor based on time alone, since, due to variations in supply voltage of the on-board network of a vehicle, changes in temperature or other interference, the timing elements must be so designed that the motor remains energized for a period of time which is longer than that for operation under optimum conditions. The motor, or any associated drive gearing coupled to the antenna, for example, should not be overloaded. To prevent such overloading, it has been proposed to introduce a slip clutch between the motor and the antenna. This is a comparatively expensive solution. Additionally, due to accumulation of dirt, icing of the antenna, or the like, projection or retraction can be delayed to such an extent that even the additional safety or reserve time is not sufficient to completely project or retract the antenna; specifically, frequently an antenna which had been subject to icing will not retract completely but will remain in partially projected position. If the reserve or safety factor time is dimensioned sufficiently long so that the antenna will reliably retract under even the most severe icing or contamination conditions, the time of operation of the motor beyond that for retraction of the antenna when it is not iced, and clean, will be excessively long. The noise level may be annoying, and the mechanical system is excessively loaded.

It has been proposed to turn OFF an antenna drive by providing a limit switch, so that the motor is turned OFF only when a certain limit position has been reached. If, however, the antenna, for example due to icing or excessive accumulation of road dirt and the like, cannot be completely projected or retracted, overloading of the drive motor may result, with possible damage or destruction thereto. Overload protection can be provided, of course, including thermal overload protection. This, however, is comparatively expensive and also subject to malfunction under widely varying ambient temperatures. Additionally, the switches which are necessary are precision switches which are expensive to manufacture and install. They are not well suited for an automotive environment, since they are subject to damage by corrosion, wide temperature variations and the like, and must be designed for high-current carrying capacity at the low voltage levels pertaining in automotive on-board vehicular networks. Reliable operation for a long period of time thus cannot be insured.

THE INVENTION

It is an object to provide an electric drive, preferably for association with a commutator-type d-c motor for use in an automotive environment, that is, operating e.g. at 12 V, nominal, with widely varying supply voltage, in which the motor is protected against overload in a simple manner and is disconnected immediately when the positioned element has reached one of its two limit positions.

Briefly, a measuring element, such as a measuring resistor, is coupled to and connected in the supply line to the motor and senses the rotary speed of operation of the motor, when energized, the measuring element providing a motor operation signal. The measuring element is coupled to a motor operating input of a control network to receive the motor speed signal. A speed signal responsive circuit is included in the control network, connected to and controlling the electrical energy supply to the motor, and disconnecting the energy supply to the motor if the speed of operation of the motor drops off below a predetermined limit. This circuit, then, disconnects power supply to the motor regardless of the position of a motor current supply ON/OFF switch. The motor, thus, is disconnected if external mechanical braking causes excessive drop of speed; the external braking may be due to the positioned element, for example an antenna rod, having reached a limit position; or due to external conditions interfering with proper positioning of the positioned element, such as contamination, icing, or the like, slowing motor operation to a degree such that the speed signal responsive circuit will respond to turn the motor OFF.

The system has the advantage that no limit switches or slip clutches are needed; rather, a simple modification of the control system determines drop in speed if the normal loading of the motor is exceeded by a predetermined amount, and, then, rapidly disconnects the motor. By eliminating a slip clutch, the antenna can be operated at any temperature, even if it is, for example, subject to icing, since motor output torque, as applied to an antenna or other positioned element, is not limited by the slip characteristics of a slip clutch, so that, for example, the braking effect of icing can be overcome.

In accordance with a preferred embodiment of the invention, the speed of the drive motor is utilized to also determine or compute the distance through which the positioned element has been moved, for example the degree of extension or retraction of a telescopic antenna. If desired, this distance can be indicated. Sensing the speed is simple if the control circuit is arranged to sense the waviness or cyclical repetition periods of the motor current, which vary in undulating manner. When a predetermined undulation or cycling time is exceeded, the motor can be disconnected by a relay.

In accordance with a particularly desirable embodiment of the invention, the circuit arrangement measures, first, the average speed or the average cycling time of the waviness or undulations of the current supplied to the motor, and stores this value to provide a reference with which the disconnect value or frequency or undulation or cycling period can be compared at subsequent measuring cycles. This permits matching the system to various drive arrangements, for example to match the extension or projection of a telescopic antenna to motor drives of various types and manufacturing origin.

DRAWING

DETAILED DESCRIPTION

The invention will be explained in connection with projection and retraction, respectively, of a motor-driven telescopic antenna for use in an automotive vehicle, in which the antenna forms a positioned element. Of course, it is equally applicable to positioning of other positioned elements.

Figure 1:
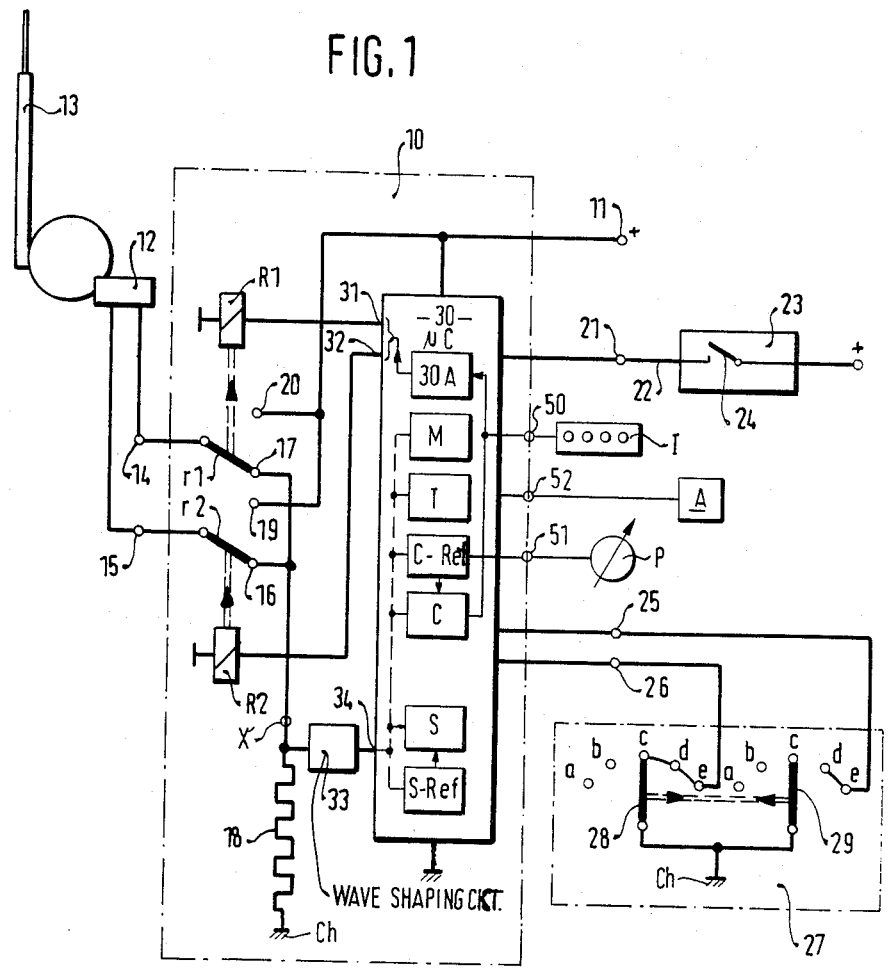
FIG. 1 shows a circuit network, applied to extension and retraction of a telescopic antenna.

The circuit is included in a network element 10, which is connected at an output terminal 11 to the positive terminal of the on-board network of an automotive vehicle, for example nominally 12 V. The voltage, of course, may vary widely depending upon operating conditions of the vehicle, conditions of the battery, and additionally connected loads, such as headlights, heaters, and the like. The telescopic antenna 13 is coupled to a d-c commutator-type motor 12, for example of the series type, to extend or retract the antenna 13 in dependence on the direction of rotation of the motor 12. Motor 12 is coupled to two output terminals 14, 15 of the network 10. The terminals 14, 15 are connected to direction-of-rotation control switches, which are shown in the embodiment as two relay switch blades r1, r2, which are, respectively, controlled by respective relay coils R1, R2. The relays R1, r1; R2, r2 have transfer contacts 17, 20; 16, 19, respectively. The quiescent or normally connected terminals 16, 17 are connected to a ground or chassis connection Ch through a measuring resistor 18. The operating terminals 19, 20 are connected to positive supply network terminal 11. The network 10 has an additional input terminal 21 which is connected to a control line 22 which, in turn, is coupled to a main ON/OFF switch 24 which, for example, may be the main switch of an automotive radio 23. The ON/OFF switch 24 likewise is connected to the positive terminal 11 through external connections, not shown. A two-pole selector switch 27 is connected to terminals 25, 26 of the network 10. Selector switch 27 is provided to control the length of projection of the antenna 13 provided the switch 24 is closed, so that the projection length of the antenna can be matched to a selected frequency band of the radio, for example, selectively, to amplitude modulated (AM) or frequency modulated (FM) reception. The selector blades 28, 29 of the switching unit 27 are, respectively, connected to ground or chassis. The selector switch 27 has five selector positions, the function of which will be explained below, and is illustrated in FIG. 1 in a central position.

A control circuit 30 which, for example, may be a portion of an integrated circuit, for example of the microprocessor type, is provided which controls, selectively, energization of the relay coils R1, R2. The control circuit 30 receives its power supply through terminal 11 and is connected via terminal 21 to the main ON/OFF switch 24, for example of the automobile radio 23. The relay coils R1, R2 are controlled from terminals 31, 32 of the control circuit 30. An additional input 34 is provided, receiving an input from a signal-processing or wave-shaping circuit 33 connected to the measuring resistor 18 in the supply current circuit of the motor 12. The positioning selector switch 27 is connected through input terminals 25, 26 to the control circuit 30.

The network components of the control circuit 30 will be obvious from an explanation of the operation.

Figure 2:
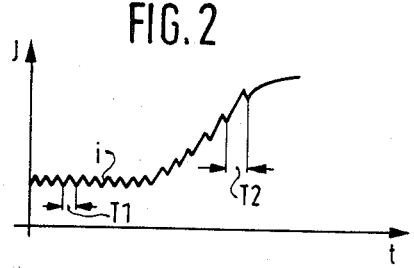
FIG. 2 shows the current, with respect to time, as the antenna reaches a limit position.

Operation, with reference to FIG. 2: The graph of FIG. 2 shows the instantaneous current J for motor 12 in advance of, and after the antenna 13 has reached a limit position. In quiescent state, that is, when switch 24 is open and, for example, car radio 23 is disconnected, the terminals 14, 15 of the motor are short-circuited.

Let it be assumed, for a first example, that the antenna 13 is to be extended to its maximum limit position. This requires moving the selector switch 27 to a maximum projected position, in the example to the position a, that is, at the extreme left deflected position. Terminals 25, 26, thus, are not connected to ground or chassis. When radio 23 is turned ON, the control circuit 30 will provide a control voltage at terminal 31, for example by sensing the concurrent conditions of voltage at terminal 21, ungrounding of terminals 25 and 26—a simple relay or logic function. Relay R1 will be energized, causing the relay blade r1 to change over and connect terminal 14 with the relay terminal 20. Motor current can thus flow: terminal 11-relay terminal 20-relay blade r1-14-12-15-relay blade r2-relay terminal 16-measuring resistor 18-chassis or ground $C^h$. A first circuit, thus, has been established. A voltage drop will occur on the measuring resistor 18 which is proportional to motor current, which is conducted to the wave-shaping or signal-shaping or analyzing circuit 33. Motor current in motor 12 operates through brushes on a rotating commutator; thus, motor current i will be wavy or undulating, which is due to periodic interruption and running of the commutator segments under the brushes of the motor 12. The frequency of this undulation is proportional to the speed of the motor 12; the cycling time or period of the undulation is reversely proportional to the speed of the motor 12.

The wave-shaping circuit or transformer 33 senses the undulations of the motor current i—for example by transformer action, and wave-shaping the sensed undulation to provide corresponding essentially square-wave pulses, which will appear in digital form. The pulses are applied to the input 34 of the control circuit 30. The digital pulses at the output of the wave-shaping circuit 33 will have the same frequency as the undulations of the motor current i. The control circuit 30 determines the cycling time period of the waviness of the motor current; it is shown in FIG. 2, when the antenna is moving normally, for example at T1.

When the antenna, as it is being projected, reaches its end or limit position, the motor speed will drop to zero. The motor current increases, and the undulation frequency of the current i drops rapidly. At the time T2, the cycling time has reached a substantially higher time period than that of the cycling time T1. The drop in frequency of the waviness of the undulation, that is, the increase in cycling time of the undulations of the motor current, is transmitted by the wave-shaping circuit 33 to the control circuit 30 over terminal 34 thereof. The time period of recurring pulses, or, from a peak of an undulation to a next one, is compared with a predetermined time period which can be stored in the control circuit 30, for example by triggering each time a monostable multivibrator; when the time period exceeds a predetermined timing value, corresponding, for example, to a predetermined drop in frequency of the undulation of the motor current J, the control circuit 30 disconnects current to the realy coil R1, that is, de-energizes terminal 31, which then disconnects the motor 12.

The antenna drive should be protected against damage; in order to prevent damage to the antenna drive as the limit position is reached, for example as an end abutment is engaged, motor 12 is braked by short-circuiting the armature, that is, by dynamic braking. The motor current circuit is, thus, shortcircuited by reversion of the relay transfer contacts r1, r2 to the position shown in FIG. 1.

The control circuit 30 includes a timing element preventing re-energization in reverse direction, for example upon energizing of the relay coil R2 after relay coil R1 has been energized, in order to insure that the motor 12 has stopped before reverse potential is applied thereto. A suitable pause time is about ½ second.

In accordance with a feature of the invention, the control circuit 30 includes a counter C which counts the pulses applied from terminal 34, generated due to the waviness of the motor current i as transferred into pulses in the wave-shaping circuit 33. The counted pulses upon energization of the motor 12 until it has stopped can be compared with a reference entered in the control circuit 30, for example in a memory C-Ref, or by suitably connecting a specific count output terminal of the counter C, to determine if the antenna 13, upon being projected or retracted, has reached its terminal position, or has stopped earlier, for example by having met an obstruction.

The antenna, for example, could not have reached its limit position due to accumulated dirt, road grime, due to icing, or the like. Such conditions may cause excessive decrease of operating speed of the motor and, due to the longer cycling time of the waviness of the motor current i, motor 12 may have been disconnected by the control circuit 30. If the counter determines that the count state therein is not that of the limit count which it should have had, the counter can provide a suitable output signal to a re-connect element 30A within the control circuit to re-energize the respective terminals 31, 32 which previously had been connected. Such reconnection may occur twice. Upon each reconnection, of course, the motor 12 will be energized with full torque, and thus will try to overcome the obstruction, for example an icing condition. If this is not successful at the second time, motor 12 is finally disconnected by the control circuit 30. Such multiple "try again" circuits are well known and, for example, may include a count-to-two circuit, in which, if one reconnection was unsuccessful, a second reconnection is effected, and if unsuccessful, an output indication is provided, for example to provide manual override.

A corresponding sequence will occur when the radio 23 is disconnected. Upon disconnection, the positive voltage from input terminal 21 is disconnected. The thus occurring negative-going pulse at terminal 21 is sensed by the control circuit 30, for example by a diode therein, which provides an energization control pulse to connect the coil R2 of the relay r2 to energize the motor 13 to retract the antenna 13. Stopping the antenna at the retracted limit position will be identical to stopping the antenna at the projected position.

Operation of selector switch 27: The projection length of the antenna can be controlled by the selector switch 27, to match the antenna to the local reception conditions, or to selected frequency bands. If the switch 28, 29 is at is far-left position, the antenna is completely projected and retracted upon connection or disconnection of the radio 23. If the selector switch is placed in the center position c then only terminal 26 of the control network 10 is connected over the terminal 28 of selector switch to ground or chassis. The terminal 25 is left open, and is ungrounded. This switching condition can be sensed by the control circuit 30. In this switching position c of the selector switch 27, the antenna 13 is extended in half-projected position when radio 23 is turned ON. Relay coil R1 is controlled via terminal 31 of the control circuit 30 and, simultaneously, the pulses are counted in the counter C, connected to the terminal 34 of the control circuit 30. When a predetermined number of count pulses have been counted, terminal 31 connected to relay coil R1 is de-energized, thus stopping the motor 12.

The number of pulses required to extend the antenna to half extension can be set in the coounter C. If the selector switch was in its first position a when the antenna was fully projected, and it is then moved into the center c position, the antenna will be retracted by half-projection.

The selector switch can also be used for additional controls. For example, let it be assumed that the radio 23 is of the cassette-type radio combination, so that it is not desired to provide for projection of the antenna 13, although the radio is turned ON to permit reproduction from a cassette. For cassette operation—and this can be coupled to the radio selector switch—the selector switch 27 is rotated into the extreme right e position, thus grounding the terminals 28, 29 of the selector switch 27. The grounding condition of the terminals 25, 26 is sensed by the control circuit 30 which, then, insures tthat no power is applied to terminal 31 even though the switch 24 is closed. Let it be assumed, however, that the radio 23 is connected, that is, switch 24 closed, and the antenna 13 projected. If, in that position, the selector switch 27 is moved all the way to the right to position e, control circuit 30 will energize relay coil R2, and thus retract the antenna. This can readily be programmed by a suitable interlock and memory circuit, in which (a) extended or projected position of antenna 13 is stored (R1 previously connected), and (b) if a stored signal appears, relay coil R2 is energized; if no signal is stored, relay coil R2 is not controlled at all.

The selector switch 27 has two additional positions, b and d. Preferably, positions b and d are not "lock" positions in which the selector switch remains but are rather of the "momentary on" type. These positions permit operator control for projecting or retracting the antenna, respectively, in steps if the selector switch is placed, respectively, in positions b, d.

Let it be assumed that the selector switch 27 was at position c, and that the radio 23 is ON. The antenna 13 has been projected to half-extension. Moving the switch 27 to the position b, ground connection between the input terminal 26 is interrupted; likewise, ground connection from input terminal 25 is interrupted. This causes the control circuit 30 to energize the relay coil R1 over terminal 31—see previous discussion with respect to extension of antenna, causing the antenna 13 to project further. The distance is sensed by counting the pulses at terminal 34, and entering the additional pulses in counter C. Depending on the length of holding the switches 28, 29 in the position b, or, alternatively, depending on the predetermined projecting distance depending on a predetermined count number corresponding, for example, to about 10 cm of projected length, control circuit 30, upon recognizing the respective count, or release of the switch 27 to center position at c, will disconnect the relay coil R1. If, however, the switch 27 is held continuously in the position b, the antenna will continue to project until, upon reaching the end position, the time T2 between pulses will reach the end-sensing time position, see prior discussion, thus disconnecting relay coil R1.

To retract the antenna, a similar sequence will occur, merely by moving the switch 27 towards the right, to the second position d. This places the input terminal 25, for a short period of time, on ground or chassis potential, which is sensed by the control circuit 30 in a similar manner to extension of the antenna. Output 32 will be enabled to energize the relay coil R2, and thus cause the antenna to be retracted over a predetermined path distance. Thereafter, the control circuit 30, by comparing a count in counter C, disconnects the motor 12. If the switch is retained in the position d, however, antenna 13 is completely retracted, and the motor disconnected by comparing the pulse gaps T2 with the predetermined time interval.

It is thus readily possible to match the antenna projection to selected operating conditions; for example, when operating close to a transmitter, the antenna should be shorter; when operating farther away, the antenna should be longer; likewise, antenna length can be matched to different operating bands of the radio.

The speed signal appearing at terminal 34 is sensed by a speed sensing circuit S within the controller 30, for comparison with a speed reference S-Ref. The speed sensing circuit may merely be a peak detector, for example, detecting peaks of the respective undulations or pulses; or a null detector, detecting passage through null of the respectively recurring undulations, and the reference circuit a timing circuit which compares the relative time of recurrence of the selected pulse characteristic—peak, passage through null, or other selected characteristic—with a reference time. A monostable multivibrator may be used; alternatively, the comparison can be carried out by frequency selective circuitry or by counters operating at a predetermined clock rate which compares the rate of the incoming pulses at terminal 34 with the predetermined rate and provides an output signal upon sensing a variation beyond a certain limit. The counter C may also be used in this mode, for example by comparing accumulated counts in a second counter, operating at a clock rate fast with respect to that of the counter which counts the pulses at terminal 34 with the pulses being entered, successively, in the counter C.

Loading of the drive motor 12 changes with ambient temperature; most of the motors of this type are highly temperaturedependent; further, the type of motor 12 which is used with the control system may also differ. In accordance with a feature of the invention, the control circuit 30 can readily be constructed to be adaptive to the type of motor used and/or ambient temperature conditions, for example by including timing circuits T in the control circuit 30 which provide a first timing period, for example 1 second, during which the average frequency or waviness of the motor current i is sensed, and including, additionally, in the control circuit 30 a memory M, connected to receive the input from terminal 34 which stores a representation of the average frequency of the motor current i during said time period. This average value is then compared with an instantaneous frequency, then applied to a terminal 34, at a later time. When the continuously measured frequency changes by a predetermined percentage value from the frequency stored in the memory M, the motor 12 is disconnected by de-energizing the respective relay coil R1, R2. The memory may, for example, be a capacitor which is charged during the predetermined time period, as determined by the timing circuit T, and if the charge on the capacitor exceeds a subsequent charge by a predetermined percentage value, for example as compared in a voltage divider, the relay R1, R2 can be disconnected. This arrangement permits elimination of changes in frequency of the undulation or waviness of the current i through the motor 12 based on different types of motors, different drives, different environmental or surrounding conditions, as well as changes due to ageing, contamination of the drive system by dirt and the like, as well as tolerances within the various components of the overall drive. In accordance with a feature of the invention, for example, the control circuit 30 can be so arranged that the motor 12 is disconnected when the time period T2 differs from the time period T1 by about half the average cycling time of T1, mathematically: T2 = 1.5 T1, approximately.

Various changes and modifications may be made, and the invention is not limited to the example described; the control system is equally suitable for any type of a commutator-type motor-driven arrangement in which reciprocating drives are used. It is particularly applicable, however, for reciprocating drives in automotive vehicles, in which the placement of limit switches is difficult, expensive, or impossible, such as a terminal limit switch determining the maximum extension of an antenna. Other reciprocating elements, such as sliding roofs, windows, or the like, may be similarly controlled.

Figure 3:
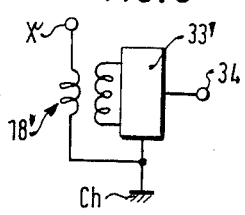
FIG. 3 is a fragmentary diagram of another embodiment.

The measuring resistor 18 is a suitable sensing element for the motor current; it is, preferably, of very low resistance. Rather than using a low-resistance resistor 18, a transformer 18' can be used, connected to wave-shaping circuit 33' (FIG.3).

The invention has been illustrated in connection with mechanical relays R1, r1, R2, r2; alternatively, suitable semiconductor relays, such as transistors or other semiconductors, may be used, which are gated ON when current is to be supplied to the motor, in the respective direction, and are turned OFF, directly or through a suitable turn-off circuit, when current is to be interrupted. It is also possible to utilize a potentiometer P insread of the selector switch 27, or a switch in combination with a potentiometer, the position of which is interrogated by an interrogation signal at terminal 51 from the control circuit 30, and which, then, by providing an electrical equivalent to a certain count number in a counter, controls the positioning distance through which the positioning motor 12 is to operate, in the example selected, thereby controlling the length of projection or retraction, respectively, of the antenna 13.

The control circuit 30 can readily be constructed in semiconductor form, or utilize commercially available microprocessors. The position of the antenna, that is, the extended position, can be shown by providing a light-emitting diode (LED) chain I connected at 50 to control circuit 30 to provide an analog or digital indication representative of the projection length of the antenna 13, by sensing a suitable number of pulses at terminal 34 and providing a corresponding output indication.

In some installations, it may be desirable to make the system destruction-proof by limiting manual override, that is, by providing an override counting or timing circuit which prevents repetitive turn-ON manually, by moving of the selector switch 28 to the respective positions b or d, so that, if the antenna should be wedged or iced to such an extent that movement would result in destruction of the motor, manual override of the automatic system is prevented after a predetermined time or number of operations, together with an output indication at alarm A connected at 52 that unusual operating conditions pertain, and disconnecting the electrical drive for a predetermined time, permitting the motor to cool or operate properly, or disconnecting the system entirely until a subsequent reset signal is sensed from operation of a main switch of the vehicle, for example by differentiating a new ON signal applied to the main switch, in a predetermined polarity direction.

In one operative embodiment, the motor 12 was a commutator-type series motor drawing current of 4 A, at 12 V, nominal, for normal projection of an automotive-type antenna. Resistor 18 had a value of 0.3 ohms, and the frequency of the current i, under normal extension of the antenna was 233.3 Hz. Turn-OFF was effected when the frequency dropped to 166.6 Hz.

In one embodiment of the invention, the control unit 30 was an integrated microprocessor of the type:
Intel Type 8748 (8 bit) or
Texas Type DMS 1000 (4 bit)

We claim:

1. Electrical positioning motor control system for automatically de-energizing a commutator-type d-c motor (12) coupled to a positioned element (13) when the positioned element has reached a predetermined position, said system having
   an operator-controlled switch (24, 27) for controlling energization of the motor;
   motor direction-of-operation control switch means (R1, r1, R2, r2) selectively energizing the motor for rotation in either of two directions, or for de-energizing the motor;
   a control circuit (30) having at least one control input (21) coupled to the operator-controlled switch and first and second outputs (31, 32) coupled to control the motor direction switch means (R1, r1, R2, r2), said system comprising, in accordance with the invention,
   a measuring means (18,33) coupled to a connection line (X) of the motor (12), sensing the rotary speed of operation of the motor, when energized, and including analyzing means (33,33') responsive to a time characteristic of the waviness of undulation of motor current in said connection line to produce a motor operation speed signal;
   a motor operation input (34) on said control circuit (30) and receiving the motor speed signal;
   a memory (M) in said control circuit (30) storing a representation of the average value of said time characteristic; and
   a speed-signal-responsive circuit (S) in said control circuit (30), connected to and controlling the electrical energy supplied to the motor and disconnecting said energy supply thereto upon sensing drop-off of speed of operation of the motor below a predetermined limit, regardless of the position of the operator-controlled switch means (24).

2. System according to claim 1, wherein the measuring means comprises means (18, 33) responsive to waviness or undulation of motor current;
   and the speed signal-responsive circuit (S) comprises means analyzing the frequency of the waviness or undulation of the motor current.

3. System according to claim 1, wherein the measuring means comprises a resistor (18) serially connected with the armature of the motor (12) and wherein said analyzing means (33) is responsive to voltage undulations across the measuring resistor, and provides output pulses having a pulse repetition rate or frequency representative of the frequency of the waviness or undulation of the motor current.

4. System according to claim 1, wherein the measuring means comprises a transformer (18') responsive to waviness or undulations of motor current and wherein said analyzing means (33') is coupled thereto and provides output pulses having a frequency representative of the frequency of the waviness or undulation of the motor current.

5. System according to claim 2, including memory means (M) coupled to the speed signal-responsive circuit (S) and storing a representation of the average cycling time or frequency (T1) of the waviness or undulations of motor current;
   and comparator means coupled to the motor operation input, and comparing actual frequency of the waviness or undulations with the stored frequency of waviness or undulations, and providing a control signal to the first and second outputs, respectively, to disconnect a previously connected motor direction-of-operation control switch means (R1, r1; R2, r2) when the frequency of waviness or undulations drops with respect to the stored frequency by a predetermined percentage of stored frequency, thus indicating an increase in cycling time of the waviness or undulations.

6. System according to claim 1, wherein the waviness or undulation analyzing means includes wave-shaping circuit (33, 33') providing digital pulses to the motor operation input (34) of the control circuit (30).

7. System according to claim 6, wherein the control circuit (30) including a counter (C) connected to receive the digital pulses, and providing a count representative of the distance through which the motor has moved the positioned element after energization of the motor.

8. System according to claim 7, including counter reference means (C-Ref) connected to the counter to selectively control the counter to count to a predetermined count number and, after the counter has counted the pulses applied thereto corresponding to the predetermined count number, controlling the respective motor control switch means (R1, R2) to de-energize the motor when the predetermined count number has been reached.

9. System according to claim 8, including indicator means (I) connected to provide an indication representative of the counted pulses and thus indicating the position of movement of the positioned element after energization of the motor.

10. System according to claim 1, further including a position distance control switch (27) having a plurality of switching positions (a, b, c, d, e), said position distance control switch being connected to said control circuit (30), said control circuit responding to selected settings of said position distance control switch to, selectively, control the distance of positioning of the positioned element (13) in dependence on the selected switching position of the position distance control switch (27).

11. System according to claim 10, wherein one of said switching positions (a) controls said control circuit (30) to be responsive to
 (a) the operator-controlled switch (23, 24) and
 (b) said speed signal-responsive circuit (S) to cause operation of the motor in a selected direction until the positioned element has reached a limit position when said speed signal-responsive circuit senses drop-off of speed of operation and disconnects the electrical energy supplied to the motor.

12. System according to claim 8, further including a position distance control switch (27) having a plurality of switching positions (a, b, c, d, e), said position control switch being connected to said control circuit (30), said control circuit responding to selected settings of said position control switch to, selectively, control the distance of positioning of the positioned element (13) in dependence on the selected switching position of the control switch (27);
 and wherein said position distance control switch (27) has a second switching position (c) which controls the control circuit (30) to permit the counter (C) to count to a predetermined count number corresponding to a preselected position of the positioned element which is in advance of a limiting position of the positioned element.

13. System according to claim 10, wherein the position distance control switch has a third switching position (e) controlling the control circuit (30) to return the positioned element (13) after a prior positioning movement thereof by the motor (12) to an extended position from a rest position, to control the direction-of-operation control circuit switch means (R1, R2) to return the positioned element to rest position, the speed signal-responsive means disconnecting energy supply to the motor when the positioned element has reached said rest position.

14. System according to claim 10, wherein the position distance control switch (27) includes fourth and fifth positions corresponding, respectively, to movement of the positioned element in two reverse directions, and controlling the respective motor direction-of-operation control switch means (R1, R2) to selectively energize the motor in a selected direction of rotation during engagement of a selected one of the fourth and fifth switching positions (b, d).

15. System according to claim 10, wherein the position distance control switch (27) comprises a selector switch having two extreme holding or locking positions (a,e) respectively commanding positioning of the positioned element (13) from a first or rest position to a second or limiting extended position, or, selectively, return from the second or limiting extended position to the rest position;
 a central locking position, in which the positioned element is commanded to assume a position intermediate the rest position and the limiting extended position;
 and two non-locking positions between, respectively, said extreme and said central positions, in which the positioned element is caused to move, during engagement with the respective intermediate non-locking position, in either direction of movement.

16. System according to claim 7, wherein the waviness or undulation analyzing means includes wave-shaping circuit (33, 33') providing digital pulses to the motor operation input (34) of the control circuit;
 further including a position distance control switch (27) having a plurality of switching positions (a, b, c, d, e), said position control switch being connected to said control circuit (30), said control circuit responding to selected settings of said position control switch to, selectively, control the distance of positioning of the positioned element (13) in dependence on the selected switching position of the control switch (27);
 wherein said position distance control switch comprises two non-locking positions (b, d), respectively controlling energization of a respective one of the motor direction switch means (R1,R2) to cause the motor to operate in a selected direction, and thus move the positioned element (13) in a selected direction;
 and wherein the control circuit includes counter means (C) and counter setting or reference means (C-Ref) counting a predetermined number of pulses, representative of movement of the positioned element, the counter setting or reference means, when a predetermined count number is reached, controlling the counter to provide a de-energization signal to the respective motor direction switch means.

17. System according to claim 7, further including an operator-controllable control element (P, 51) coupled to the counter setting or reference means (C-Ref) to control the count at which the counter (C) will control the respective motor direction switch means to de-energize the motor.

18. System according to claim 17, wherein the operator-controllable control element comprises a potentiometer (P) providing a voltage for controlling the count setting or reference means (C-Ref).

19. System according to claim 1, wherein the control circuit (30) comprises a timer (T) connected to and establishing a timing interval upon disconnection of the energy supply to the motor (12) and inhibiting reconnection of energy supply to the motor at a polarity which would cause reverse operation of the motor with respect to a prior direction of operation.

20. System according to claim 1, further comprising an alarm indicator (A) connected to and controlled by the control circuit (30) and providing an output indication upon occurrence of electrical parameters, including at least one of: speed signal; frequency of speed signal; motor energization current;
 beyond a predetermined limit.

21. System according to claim 2, wherein said memory (M) is responsive to the speed-signal-responsive circuit (S) and stores a representation of average frequency of waviness and undulations of the motor current;

and wherein the control circuit (30) includes means (S-Ref.) connected to the speed-signal-responsive circuit and controlled by the memory to control or set the predetermined limit of drop-off of speed of operation of the motor, at which energy supply is disconnected to the motor, as a function of, and in dependence on, the stored average frequency of the waviness or undulations of the motor current.

22. System according to claim 2, in combination with an automobile radio (23), wherein said positioned element comprises a telescoping-type antenna, said motor being coupled for, respectively, extension and retraction of said antenna;

and wherein the operator-controlled switch (24) comprises the ON-OFF switch of the radio.

23. System according to claim 22, further including counter means (C) coupled to the speed signal-responsive circuit (S) and counting the numbers of cycles of waviness or undulations of the motor current to obtain a count number representative of distance of extension or retraction, respectively, of the antenna;

and re-energization means connected to re-energize the motor in a retracting direction, if, upon a prior retracting movement, the count number in the counter indiates that the antenna is not fully retracted, to apply full operating torque, abruptly, to the motor after a prior interruption of energization thereof with the antenna still partially extended.

24. System according to claim 1, wherein said time characteristic is the period of motor current undulation and said speed-signal-responsive circuit (S) includes a monostable multivibrator.

25. System according to claim 1, wherein said time characteristic is the period of motor current undulation and said speed-signal-responsive circuit (S) includes a counter.

26. System according to claim 1, wherein said time characteristic is the frequency of motor current undulation.

* * * * *